Thomas Payne, Churn.

72535

PATENTED DEC 24 1867

Witnesses
Thos. Inshe
Wm. Trewin

Inventor
Thos. Payne
Per Munn &
Attorneys

United States Patent Office.

THOMAS PAYNE, OF GRAND RAPIDS, MICHIGAN.

Letters Patent No. 72,535, dated December 24, 1867.

IMPROVEMENT IN CHURNS.

*The Schedule referred to in these Letters Patent and making part of the same.*

TO ALL WHOM IT MAY CONCERN:

Be it known that I, THOMAS PAYNE, of Grand Rapids, in the county of Kent, and State of Michigan, have invented a new and improved Churn; and I do hereby declare that the following is a full, clear, and exact description thereof, which will enable others skilled in the art to make and use the same, reference being had to the accompanying drawings, forming part of this specification.

This invention relates to a new and improved churn of that class in which a rotary dasher is employed, and it consists in a novel manner of constructing the dasher, as hereinafter fully shown and described, whereby it is believed that the cream is acted upon in a more favorable manner than hitherto for the expeditious production of superior butter. In the accompanying sheet of drawings—

Figure 1:
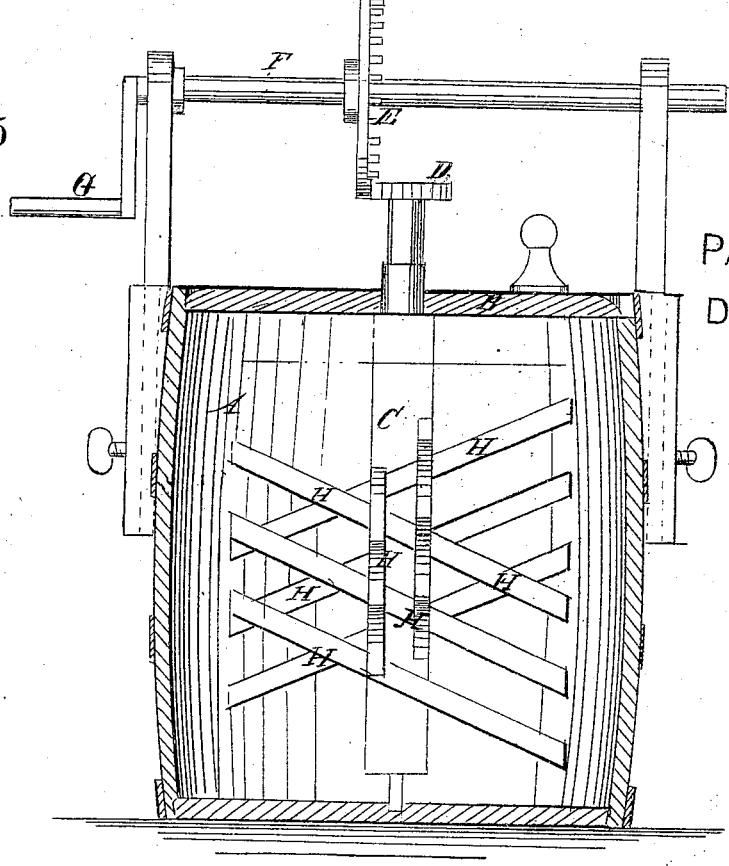

Figure 1 is a vertical central section of my invention.

Figure 2:
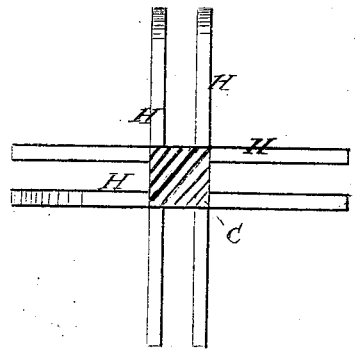

Figure 2, a detached horizontal section of the dasher.

Similar letters of reference indicate corresponding parts.

A represents the cream-receptacle, which may be provided with a suitable lid or cover B, and within the receptacle there is placed a vertical shaft, C, which extends up centrally through the lid or cover, and has a pinion, D, upon it, into which a wheel, E, gears, the latter being on a horizontal shaft, F, the bearings of which are attached to the sides of the cream-receptacle. The shaft F has a crank, G, at one end, for the convenience of turning it. The portion of the shaft C within the cream-receptacle is of square form, and has a series of beaters, H, attached obliquely to it, the beaters at the opposite sides of the shaft being in reverse positions, so that they will cross each other, as shown clearly in fig. 1. These beaters thus arranged form a sort of rigid netting or lattice-work, which operates in the most efficient manner in the cream, so as to cause the butter to be produced within a very limited time, and without breaking the "grain" of the butter, so as to render the same oily and insipid.

Having thus described my invention, what I claim as new, and desire to secure by Letters Patent, is—

The oblique beaters H, attached to the rotating shaft C in the cream-receptacle, substantially in the manner as and for the purpose herein set forth.

THOMAS PAYNE.

Witnesses:
GEORGE H. WHITE,
CORNELIUS B. TANNER.